United States Patent
Bischof et al.

(10) Patent No.: US 10,898,856 B2
(45) Date of Patent: Jan. 26, 2021

(54) EXHAUST FILTER WITH ACTIVE PLUGS

(71) Applicant: Corning Incorporated, Corning, NY (US)

(72) Inventors: Christian Bischof, Lampertheim (DE); David Robert Heine, Horseheads, NY (US); Ameya Joshi, Horseheads, NY (US); Barbara Anna Oyer, Hornell, NY (US); Todd Parrish St Clair, Painted Post, NY (US); Patrick David Tepesch, Corning, NY (US)

(73) Assignee: Corning Incorporated, Corning, NY (US)

( * ) Notice: Subject to any disclaimer, the term of this patent is extended or adjusted under 35 U.S.C. 154(b) by 730 days.

(21) Appl. No.: 15/508,812

(22) PCT Filed: Sep. 2, 2015

(86) PCT No.: PCT/US2015/048010
§ 371 (c)(1),
(2) Date: Mar. 3, 2017

(87) PCT Pub. No.: WO2016/036780
PCT Pub. Date: Mar. 10, 2016

(65) Prior Publication Data
US 2017/0282124 A1    Oct. 5, 2017

Related U.S. Application Data

(60) Provisional application No. 62/045,217, filed on Sep. 3, 2014.

(51) Int. Cl.
*B01J 29/04*    (2006.01)
*B01D 53/94*    (2006.01)
(Continued)

(52) U.S. Cl.
CPC ....... *B01D 53/9418* (2013.01); *B01D 46/244* (2013.01); *B01J 29/06* (2013.01);
(Continued)

(58) Field of Classification Search
CPC ........ B01D 53/9418; B01D 2251/2062; B01D 2255/9155; B01D 2255/50;
(Continued)

(56) References Cited

U.S. PATENT DOCUMENTS

| | | |
|---|---|---|
| 5,750,026 A | 5/1998 | Gadkaree et al. |
| 6,840,976 B2 | 1/2005 | Vance et al. |

(Continued)

FOREIGN PATENT DOCUMENTS

| | | |
|---|---|---|
| CN | 103282327 A | 9/2013 |
| EP | 1418032 A2 | 11/2003 |

(Continued)

OTHER PUBLICATIONS

English Translation of CN201580059542.9 Office Action dated Oct. 22, 2018; 9 Pages; Chinese Patent Office.

(Continued)

*Primary Examiner* — Haytham Soliman
(74) *Attorney, Agent, or Firm* — Kurt R. Denniston

(57) ABSTRACT

A ceramic honeycomb body having intersecting walls that form channels extending axially from a first end face to a second end face and plugs to seal the channels at least at one of the first end face and the second end face. The plugs include a first active component, such as a catalytically active component or a chemically active component, of the plug structure, wherein the intersecting walls comprise no first active component and optionally have a second active component of the wall structure or disposed on the walls. Included are methods of making the ceramic honeycomb (Continued)

body having plugs of the first active component and walls with no first active component.

21 Claims, 10 Drawing Sheets

(51) Int. Cl.
```
B01J 29/76      (2006.01)
B01J 35/04      (2006.01)
B01D 46/24      (2006.01)
C04B 38/00      (2006.01)
C04B 28/24      (2006.01)
C04B 35/195     (2006.01)
B28B 11/00      (2006.01)
B01J 29/06      (2006.01)
B01J 37/02      (2006.01)
C04B 111/00     (2006.01)
```

(52) U.S. Cl.
CPC ............. *B01J 29/763* (2013.01); *B01J 35/04* (2013.01); *B01J 37/0203* (2013.01); *B28B 11/006* (2013.01); *C04B 28/24* (2013.01); *C04B 35/195* (2013.01); *C04B 38/0006* (2013.01); *C04B 38/0012* (2013.01); *B01D 2251/2062* (2013.01); *B01D 2255/20761* (2013.01); *B01D 2255/50* (2013.01); *B01D 2255/9155* (2013.01); *C04B 2111/0081* (2013.01); *C04B 2111/00793* (2013.01); *C04B 2235/3463* (2013.01); *C04B 2235/3481* (2013.01); *C04B 2235/449* (2013.01); *Y02A 50/20* (2018.01); *Y02T 10/12* (2013.01)

(58) Field of Classification Search
CPC ...... B01D 2255/20761; B01D 53/8625; B01D 46/244; B01J 29/06; B01J 37/0203; B01J 35/04; B01J 29/763; B28B 11/006; Y02T 10/22; Y02A 50/2325; C04B 2235/3481; C04B 2235/3463; C04B 2111/00793; C04B 2111/0081; C04B 2235/449; C04B 35/195; C04B 28/24; C04B 38/0006; C04B 38/0012
USPC ......................................................... 502/60
See application file for complete search history.

(56) References Cited

U.S. PATENT DOCUMENTS

| | | | |
|---|---|---|---|
| 7,107,763 B2 | 9/2006 | Suwabe et al. | |
| 7,429,285 B2 | 9/2008 | Kuki et al. | |
| 7,687,008 B2 | 3/2010 | Okazaki et al. | |
| 8,080,208 B2 | 12/2011 | Kim | |
| 8,283,282 B2 | 10/2012 | Noguchi et al. | |
| 8,349,755 B2 | 1/2013 | Ogunwumi et al. | |
| 8,541,331 B2 | 9/2013 | Li et al. | |
| 8,936,747 B2 | 1/2015 | Naruse et al. | |
| 2002/0175451 A1 | 11/2002 | Vance et al. | |
| 2002/0178707 A1 | 12/2002 | Vance et al. | |
| 2005/0129907 A1* | 6/2005 | Yamaguchi | B01D 46/244 428/116 |
| 2006/0153748 A1 | 7/2006 | Huthwohl et al. | |
| 2007/0140928 A1 | 6/2007 | Beall et al. | |
| 2008/0241009 A1 | 10/2008 | Ohno et al. | |
| 2010/0058745 A1 | 3/2010 | Kim | |
| 2014/0065352 A1 | 3/2014 | Audinwood et al. | |
| 2014/0093442 A1 | 4/2014 | Spreitzer et al. | |

FOREIGN PATENT DOCUMENTS

| | | | |
|---|---|---|---|
| EP | 1541233 A1 | 12/2004 | |
| JP | 2004-168030 A | 6/2004 | |
| JP | 2004-532145 A | 10/2004 | |
| JP | 2011206636 A | 10/2011 | |
| JP | 05219741 B2 | 6/2013 | |
| JP | 05219742 B2 | 6/2013 | |

OTHER PUBLICATIONS

Machine Translation of JP2017512802 Office Action dated Apr. 24, 2019, Japan Patent Office, 6 Pgs.

G.C. Koltsakis, et al., "Modeling dynamic phenomena in 3-way catalytic converters", Chemical Engineering Science, 1999, vol. 54, pp. 4567-4578.

C.A. Laroo, et al., "Emissions of PCDD/Fs, PCBs, and PAHs from a Modern Diesel Engine Equipped with Selective Catalytic Reduction Filters", SAE International Journal of Engines, Jun. 2013, vol. 6, No. 2, pp. 1311-1339.

Okada; "Automotive and Industrial Applications of Structural Ceramics in Japan"; Journal of the European Ceramic Society; 28 (2008) 1097-1104.

Hughes et al; "Ultra Thinwall Light-Off Performance-Varying Substrates, Catalysts, and Flow Rates; Models and Engine Testing" SAE Publication 2002-01-0352.

Japanese Patent Application No. 2017512802 Office Action dated Mar. 5, 2020; 4 Pages; Japanese Patent Office.

Japanese Patent Application No. 2017-512802, Notice of Allowance dated Sep. 30, 2020, 5 pages (2 pages of English Translation and 3 pages of Original Document); Japanese Patent Office.

\* cited by examiner

EXHAUST FILTER WITH ACTIVE PLUGS

CROSS REFERENCE TO RELATED APPLICATION

This application claims the benefit of priority under 35 U.S.C. § 365 of International Patent Application Serial No. PCT/US2015/048010, filed on Sep. 2, 2015, designating the United States of America, which in turn claims the benefit of priority under 35 U.S.C. § 119 of U.S. Provisional Patent Application Ser. No. 62/045,217, filed on Sep. 3, 2014, the contents of which are relied upon and incorporated herein by reference in their entirety.

BACKGROUND

Field

Exemplary embodiments of the present disclosure relate to exhaust filters with active plugs.

Discussion of the Background

Ceramic wall flow filters can be used for the removal of particulate pollutants from diesel, gasoline, or other combustion engine exhaust streams. There are a number of different approaches for manufacturing such filters from channeled honeycomb structures formed of porous ceramics. For example, one approach is to position cured plugs of sealing material at the ends of alternate channels of such structures, which can block direct fluid flow through the channels and force the fluid stream through the porous channel walls of the honeycombs before exiting the filter.

The after-treatment of exhaust gas from internal combustion engines may use catalysts supported on high-surface area substrates and a catalyzed filter for the removal of carbon soot particles. Catalyst supports may be refractory, thermal shock resistant, stable under a range of $pO_2$ conditions, non-reactive with the catalyst system, and offer low resistance to exhaust gas flow. Porous ceramic flow-through honeycomb substrates and wall-flow honeycomb filters (generically referred to herein as honeycomb bodies) may be used in these applications.

Aspects of plugging honeycomb structures include plug depth and plug quality. Plug quality is often correlated to the presence of voids in the plugs. In general, the presence of voids can be reduced by reducing the amount of water in the plugging composition and/or increasing the particle size of certain batch components in the plugging composition. However, such modifications can lead to plugs with insufficient depth and, hence, insufficient mechanical (or "push out") strength.

On the other hand, shorter plugs can provide less back pressure, higher filter volume for the same external geometry, thus reducing the frequency of regenerations and improving fuel economy. Moreover, shorter plugs provide better material utilization, thereby reducing filter manufacturing costs. Accordingly, it may be desirable to provide plugs that are as short as possible while still having the requisite depth to provide sufficient mechanical (or "push out") strength.

Ceramic cement may be used to form an exterior skin of a honeycomb body which has been machined or "contoured" to a desired dimension, or an exterior skin may be co-extruded with the honeycomb body. As used herein, the term "honeycomb body" includes single honeycomb monoliths and honeycomb bodies formed by multiple honeycomb segments that are secured together, such as by using a ceramic cement to form a segmented monolith.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide an active plugging composition for applying to a honeycomb body.

Exemplary embodiments of the present disclosure also provide a honeycomb body comprising active plugs.

Exemplary embodiments of the present disclosure also provide a method of making a honeycomb body comprising active plugs.

Additional features of the invention as claimed will be set forth in the description which follows, and in part will be apparent from the description, or may be learned by practice of the claimed invention.

An exemplary embodiment discloses a plugging batch cement composition including an active component, a refractory filler having a particle size distribution, an organic binder, an inorganic binder and a liquid vehicle having a rheology configured to be disposed in channels of an uncoated honeycomb body at an end face to seal the channels.

An exemplary embodiment also discloses a honeycomb body including intersecting walls that form channels extending axially from a first end face to a second end face and active plugs to seal at least one of a first portion of the channels at the first end face and a second portion of the channels at the second end face. Each active plug includes a first active component, wherein the first active component comprises at least one of a catalytically active component and a chemically active component of the plug structure, wherein the intersecting walls do not comprise the first active component.

An exemplary embodiment also discloses a method of plugging a honeycomb body having intersecting walls that form channels extending axially from a first end face to a second end face. The method includes applying to the honeycomb body to form active plugs, a composition. The composition includes an active component, a refractory filler having a particle size distribution, an organic binder, an inorganic binder, and a liquid vehicle, wherein the active component comprises at least one of a catalytically active component and a chemically active component, and wherein the intersecting walls do not comprise the active component.

It is to be understood that both the foregoing general description and the following detailed description are exemplary and explanatory and are intended to provide further explanation of the invention as claimed.

BRIEF DESCRIPTION OF THE DRAWINGS

The disclosure can be understood from the following detailed description, either alone or together with the accompanying drawings. The drawings are included to provide a further understanding of the disclosure, and are incorporated in and constitute part of this specification. The drawings illustrate one or more exemplary embodiments and, together with the description, serve to explain various principles and operation of the disclosure.

FIG. 5A is a grey scale fringe plot and FIG. 5B is a line contour plot.

FIG. 6A is a grey scale fringe plot and FIG. 6B is a line contour plot.

FIG. 7A is a grey scale fringe plot and FIG. 7B is a line contour plot.

DETAILED DESCRIPTION

Figure 1:
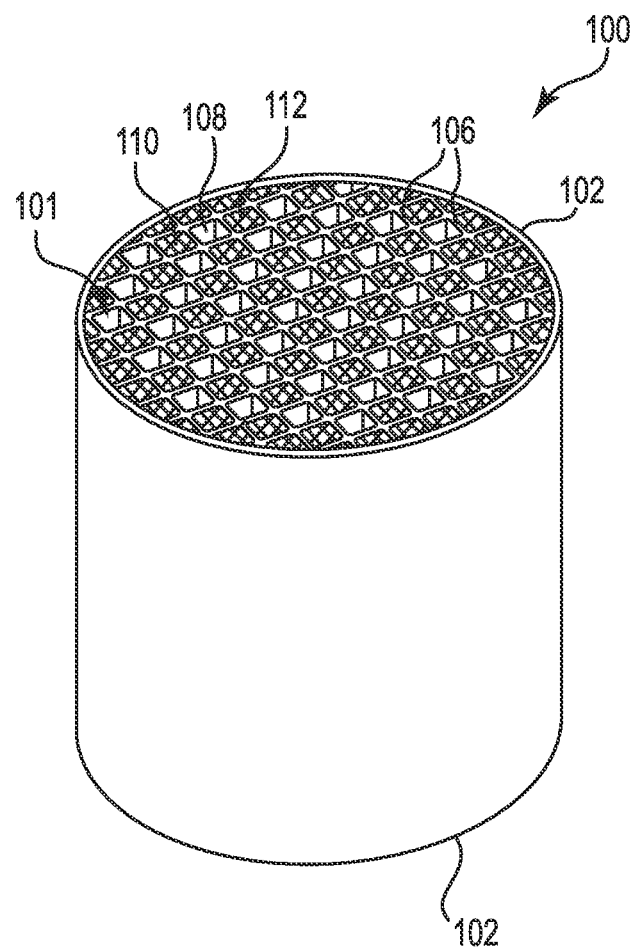
FIG. 1 is an isometric view of porous honeycomb filter.

The disclosure is described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these embodiments are provided so that this disclosure is thorough, and will fully convey the scope of the disclosure to those skilled in the art. In the drawings, the size and relative sizes of layers and regions may be exaggerated for clarity.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

FIG. 1 illustrates an exemplary honeycomb wall flow filter 100 according to exemplary embodiments of the disclosure. The general structure includes a body 101 made of intersecting porous ceramic walls 106 extending from a first end face 102 to a second end face 104. The intersecting porous ceramic walls 106 form channels extending axially from the first end face 102 to the second end face 104. Certain channels are designated as inlet channels 108 and certain other channels are designated as outlet channels 110. In the filter 100, certain selected channels include plugs 112. Generally, the plugs are arranged at the ends of the channels and in some defined pattern, such as the checkerboard patterns shown. The inlet channels 108 may be plugged at the outlet end face 104 and the outlet channels 110 may be plugged at the inlet end face 102. Other plugging patterns may be employed and all of the outermost peripheral channels may be plugged (as shown) for additional strength. Alternately, some of the channels may be plugged other than at the ends. In embodiments, some channels can be flow-through channels and some can be plugged providing a so-called partial filtration design. In embodiments, the wall thickness of each channel wall 14 for the filter can be for example from about 0.003 to about 0.030 inches (about 76 to about 762 µm). The cell density can be for example between about 100 and 900 cells per square inch (cpsi).

In exemplary embodiments, the body 101 can include at least one of cordierite, mullite, alumina, silicon carbide, zirconia, corundum, corundum-mullite, spodumene, and aluminum titanate, but is not limited thereto.

In exemplary embodiments, the body 101 may be a honeycomb ceramic body to be used as a particulate filter with the operation of vehicle engines or other environmental applications. The network of channels may also be a honeycomb network. However, embodiments described herein are not limited thereto. For example, various geometries may be incorporated in accordance with various exemplary embodiments. The channels can include a rectangular (e.g., square) cross-section, other polygonal shape having three or more sides, or a combination thereof, wherein the channels may also be of various cross-section size. Further, the body 101 can include an outer cross-sectional periphery that is circular, oval, another curved shape, polygonal shape such as triangular, rectangular (e.g., square), or other polygonal shape.

With reference again to FIG. 1, either before or after the green body has been fired, a portion of the channels 110 of a formed monolithic honeycomb 100 can be plugged at the inlet end 102 with a paste having the same or similar composition to that of the body 101. The plugging can be performed only at the ends of the channels 110 or spaced apart from the inlet end 102 of the channels 110 for fast light-off and form plugs 112 having a depth of about 5 to 20 mm, although this can vary. A portion of the channels 108 on the outlet end 104 but not corresponding to those on the inlet end 102 may also be plugged in a similar pattern. Therefore, each channel is plugged only at one end. The arrangement can have every other cell on a given face plugged as in a checkered pattern as shown in FIG. 1. Further, the inlet and outlet channels 108, 110 can be any desired shape. However, in the exemplified embodiment shown in FIG. 1, the cell channels are square in cross-sectional shape.

Catalyst can be added to the porous ceramic honeycomb body by washcoating, which deposits catalytic material in the porous walls of the honeycomb and sometimes on the channel surfaces. High temperatures occurring during soot burn-out can deteriorate the catalyst due to temperature aging. A high initial amount of active washcoat can be used to compensate and to comply with emissions regulations that may specify compliance after a required vehicle aging and therefore catalyst aging period. Also, washcoating generally adds to a filter's backpressure and the backpressure of the washcoated filter must not be too high to avoid a power or fuel consumption penalty. Washcoated filters, while catalytically active, have higher pressure drop compared to a bare filter and thus reduce power and efficiency of the engine. For example, achieving low washcoated pressure drop may be challenging for diesel particulate filters (DPFs) with integrated selective catalytic reduction (SCR) catalytic functionality when the washcoat loading required to achieve emissions targets is high. The pressure drop of such integrated DPFs can be sensitive to small changes in washcoat loading.

To address catalyst aging and the higher pressure drop the porosity of the honeycomb material may be increased to enable high washcoat loadings at low backpressure. Trade-offs may be increased cost, reduced soot-mass limit, and decreased mechanical strength of the honeycomb body. Another strategy to address catalyst aging and the higher pressure drop is to use a larger filter volume, but this leads to increased space and material cost. Also to address catalyst aging and the higher pressure drop a honeycomb material composed of the catalyst material may be used, leading to decreased soot mass limit, but with decreased thermo-mechanical durability and likely increased cost.

NOx conversion of exhaust gas is initially focused at the inlet of a filter catalyzed with SCR coating since the inlet heats up more quickly than the rest of the filter. Low temperature and early heat up conditions have been the most difficult conditions to achieve good conversion. For filters, the presence of the plugs on the inlet face make the task more difficult as the additional mass of the plugs delays the thermal response of the inlet region. It was surprisingly discovered that making the plugs themselves reactive such that they participate in the conversion of the exhaust gas improved low temperature and early heat up conditions to achieve good conversion. It was further discovered that shifting the plug mass further down the filter channel improved low temperature and early heat up conditions to achieve good conversion.

In the broadest terms, exemplary embodiments of the present disclosure provide a filter with at least one of catalytically active and chemically active plugs. The at least one of catalytically active and chemically active plugs are referred to herein as active plugs and material that is at least one of catalytically active and chemically active is referred to herein as active material. The active plugs are more than simply inactive or non-active plugs (inert plugs) coated with an active material. In other words, a batch cement composition that forms each plug includes the active material. The active material is incorporated in and forms the structure of the active plugs.

As used herein, active material in an active body, for example, plugs or walls, refers to active material incorporated in to form the structure of the active body. The structure of the body refers to, for example, ligaments between pores. Likewise, an active body containing an active material refers to active material incorporated in to form the structure of the active body. In contrast, active material on a body or on an active body, for example, plugs or walls, refers to active material disposed on a surface including a surface in a pore of the body or active body, for example, as a result of washcoating or similar process.

The active material in the active plugs can, for example, be a zeolite. The active material can be small pore zeolite such as copper-chabazite zeolite (CuCHA), present as catalyst for the selective catalytic reduction of NOx, Cu-exchanged zeolite, Fe-exchanged zeolite, a hydrocarbon-adsorbing zeolite, a high-surface-area material such as alumina, ceria, or zirconia with dispersed precious-metal such as Pt, Pd, or Rh, high surface area titania with vanadia, rhodium-titania, calcium carbonate, HC traps, high surface area material plus a noble metal, high surface area material, on board diagnosis oxygen storage material, ceria:zirconia solid solution material, ceria and zirconia multi-phase material, a three way catalyst (TWC), an alkali earth metal oxide such as potassium carbonate:cobalt oxide:lanthanum oxide, and the like, or mixtures thereof.

The active plugs can be a mixture of active and inactive materials, such as a mixture of zeolite, cordierite, and colloidal silica. For example, a method of making an exhaust gas filter with copper zeolite plugs includes the plugging paste having a copper salt such as copper-acetate and a colloid silica binder. In addition, the active plugs may further be coated with an active material, for example, platinum, palladium, rhodium, zeolites, a high-surface-area material such as alumina, ceria, or zirconia with dispersed precious-metal such as Pt, Pd, or Rh, high surface area titania with vanadia, etc., and combinations thereof.

According to these exemplary embodiments, the active plugs are made from active batch cement compositions. The compositions can include active and inactive materials. For example, the inactive materials can include an inert refractory filler having a particle size distribution, an organic binder, an inorganic binder, and a liquid vehicle. The active materials can include an active filler such as a zeolite, copper-exchanged zeolite, iron-exchanged zeolite, copper-chabazite, a hydrocarbon-adsorbing zeolite, a high-surface-area material such as alumina, ceria, or zirconia with dispersed precious-metal such as Pt or Pd, high surface area titania with vanadia, and the like, or mixtures thereof.

The refractory filler, the particle size distribution of the refractory filler, the organic binder, and the inorganic binder are selected such that, when the composition including the active material is applied to plug a plurality of channels of the honeycomb body, a plurality of plugs formed therefrom have the desired properties, such as plug depth variability, plug depth, push-out strength, catalytic activity, chemical activity, coefficient of thermal expansion (CTE), porosity, permeability, etc.

The inert refractory filler can include at least one inorganic powder. The inorganic powder may, for example, include a ceramic, i.e., pre-reacted or ceramed, refractory powder. In other embodiments, the powders can be refractory glass powders, or glass-ceramic powders. Still further, in other embodiments the inorganic powder batch mixture can comprise any combination of two or more of the aforementioned refractory powders. Exemplary refractory powders may include cordierite, mullite, aluminum titanate, silicon carbide, silicon nitride, calcium aluminate, beta-eucryptite, and beta-spodumene.

The compositions further comprise a binder component comprised of an inorganic binder. In some embodiments, the inorganic binder is a gelled inorganic binder such as gelled colloidal silica. Other embodiments of an inorganic binder could include a non-gelled colloidal silica, a powdered silica, or a low-temperature glass. According to embodiments, the incorporation of a gelled inorganic binder may minimize or even prevent the migration of the inorganic binder particles into microcracks of a honeycomb body on which the composition is applied. Accordingly, as used herein, the term "gelled inorganic binder" refers to a colloidal dispersion of solid inorganic particles in which the solid inorganic particles form an interconnected network or matrix in combination with a continuous fluid phase, resulting in a viscous semi-rigid material. Further, it should be understood that there can be relative levels or degrees of gelation. To that end, since a colloidal dispersion can comprise solid particles having particle sizes diameters less than 150 nm, such as less than 50 nm, and further such as less than 25 nm, and still further such as less than 15 nm, a gelled inorganic binder as used herein comprises an interconnected network of the dispersed inorganic particles that is sufficient to prevent at least a portion of the inorganic binder particles from migrating into microcracks of a honeycomb structure upon which the composition containing the gelled inorganic binder has been applied.

Accordingly, the non-gelled colloidal silica can subsequently be gelled by the addition of one or more gelling agents to the composition. In embodiments, colloidal silica may be gelled by increasing the ion concentration of the composition. In other embodiments, colloidal silica can be gelled by altering the pH of the composition. Still further embodiments can comprise both increasing the ion concentration and altering the pH of the composition. It should be understood that the gelling agent can be used in any amount effective to provide a gelled inorganic binder as described herein.

Exemplary colloidal silicas can include the Ludox® HS, AS, SK, PW50, and PZ50 available from W.R. Grace & Company, and can be gelled by increasing the ion concentration by addition of salts and/or by changing the pH. Ludox® PW50EC, a polydisperse colloidal silica, has a much broader particle size range than the small silica particle size of Ludox® HS-40. Ludox® PW50EC has a particle size range $D_{50}$ of approximately 10-100 nm particle size distribution (PSD) as compared to about 12 nm $D_{50}$ in Ludox® HS-40. In theory, the larger particles of Ludox® PW50EC do not migrate as easily leaving them dispersed and in the bulk cement mixture. The smallest of the particles in the Ludox® PW50EC are still able to migrate and migrate into the substrate.

Exemplary compositions disclosed herein may further comprise an organic binder. The addition of the organic binder component can further contribute to the cohesion and plasticity of the composition prior to firing. This improved cohesion and plasticity can, for example, improve the ability to shape the composition. This can be advantageous when utilizing the composition to form skin coatings or when plugging selected portions (such as the ends) of a honeycomb structural body. Exemplary organic binders include cellulose materials. Exemplary cellulose materials include cellulose ether binders such as methylcellulose, hydroxypropyl methylcellulose, methylcellulose derivatives, and/or any combinations thereof. For example, cellulose materials include combination of methylcellulose and hydroxypropyl methylcellulose. For example, the organic binder can be present in the composition as a super addition in an amount in the range of from 0.1 weight percent to 5.0 weight percent of the inorganic powder batch composition, or even in an amount in the range of from 0.5 weight percent to 2.0 weight percent of the inorganic powder batch composition.

An exemplary liquid vehicle for providing a flowable or paste-like consistency to the disclosed compositions is water, although other liquid vehicles can be used. To this end, the amount of the liquid vehicle component can vary in order to provide optimum handling properties and compatibility with the other components in the batch mixture. According to some embodiments, the liquid vehicle content is present as a super addition in an amount in the range of from 15% to 60% by weight of the inorganic powder batch composition, or even according to some embodiments can be in the range of from 20% to 50% by weight of the inorganic powder batch mixture. Minimization of liquid components in the compositions can also lead to further reductions in the drying shrinkage of the compositions during the drying process.

Exemplary compositions disclosed herein can optionally comprise one or more processing aids such as a plasticizer, lubricant, surfactant, sintering aid, rheology modifier, thixotropic agent, dispersing agents, or pore former. An exemplary plasticizer for use in preparing the plugging composition is glycerine. An exemplary lubricant can be a hydrocarbon oil or tall oil. Exemplary commercially available lubricants include Liga GS, available from Peter Greven Fett-Chemie and Durasyn® 162 hydrocarbon oil available from Innovene. A commercially available thixotropic agent is Benaqua 1000 available from Rheox, Inc. A pore former, may also be optionally used to produce a desired porosity of the resulting ceramed composition. Exemplary and non-limiting pore formers can include graphite, starch, polyethylene beads, and/or flour. Exemplary dispersing agents that can be used include the NuoSperse® 2000 from Elementis and ZetaSperse® 1200, available from Air Products and Chemicals, Inc.

To prepare exemplary compositions as disclosed herein, the inactive and active components as described above can be mixed together, the inorganic powder batch mixture as described above can be mixed together with the organic binder, followed by the incorporation of the liquid vehicle and inorganic binder components. As mentioned above, the inorganic binder can be non-gelled or gelled either before or after having been introduced into the composition. If the inorganic binder is to be gelled prior to addition to the composition, the one or more gelling agents can be added to the inorganic binder, such as for example, a colloidal silica. Alternatively, if the inorganic binder is to be gelled after addition to the powder composition, the one or more gelling agents can be introduced directly into the composition. Any optional processing aids can also be introduced into the composition during or after the liquid addition. However, if desired a rheology modifier, such as polyvinyl alcohol can first be mixed with the inorganic binder and, optionally the refractory powder. Once the desired components are combined, the composition can be thoroughly mixed to provide a flowable paste-like consistency to the composition. In an exemplary embodiment, the mixing as described above can be done using a Littleford mixer or a Turbula mixer.

Once formed, the compositions disclosed herein can be applied to a honeycomb body or structure defining a plurality of cell channels bounded by cell channel walls as described above. In exemplary embodiments, the compositions disclosed herein can be used as plugging material to plug selected channels of a honeycomb body in order to form a wall flow filter. For example, in a honeycomb body having a plurality of cell channels bounded by porous cell channel walls, at least a portion of the plurality of cell channels can comprise active plugs, wherein the active plugs are formed from a composition as disclosed herein. In some embodiments, a first portion of the plurality of cell channels can comprise an active plug sealed to the respective channel walls at or near the upstream inlet end to form outlet cell channels. A second portion of the plurality of cell channels can also comprise an active plug sealed to the respective channel walls at or near the downstream outlet end to form inlet cell channels. Other configurations having only one end plugged, as well as partially plugged configurations (having some unplugged channels) are also contemplated.

Once the composition has been applied to a honeycomb structure in a manner as described herein, the composition can be optionally dried and/or fired. The optional drying step can comprise first heating the composition at a temperature and for a period of time sufficient to at least substantially remove any liquid vehicle that may be present in the composition. As used herein, at least substantially removing any liquid vehicle includes the removal of at least 90%, at least 95%, at least 98%, at least 99%, or even at least 99.9% of the liquid vehicle present in the composition prior to firing. Exemplary and non-limiting drying conditions suitable for removing the liquid vehicle include heating the composition at a temperature of at least 50° C., at least 60° C., at least 70° C., at least 80° C., at least 90° C., at least 100° C., at least 110° C., at least 120° C., at least 130° C., at least 140° C., or even at least 150° C. In one embodiment, the conditions effective to at least substantially remove the liquid vehicle comprise heating the composition at a temperature in the range of from 60° C. to 120° C. Further, the heating can be provided by any conventionally known method, including for example, hot air drying, IR, RF and/or microwave drying.

The optional firing step can include conditions suitable for converting the composition to a primary crystalline phase ceramic composition include heating the honeycomb with applied composition to a peak temperature of greater than 800° C., 900° C., and even greater than 1000° C. A ramp rate of about 120° C./hr during heating may be used, followed by a hold at the peak temperature for a temperature of about 3 hours, followed by cooling at about 240° C./hr.

Compositions disclosed herein can include those that set at a temperature of less than 200° C., such as a temperature of less than 100° C., and further such as a temperature of less than 50° C., including compositions that can be used in plugging processes employing "cold set" plugs. In cold set plugging, only drying of the plugging mixture is required to form a seal between the plugs and the channel walls of the honeycombs. When a cold set plugging process is employed, heating of the plugged honeycombs to temperatures in the 35-110° C. range can be useful to accelerate drying. In some cold set plugging processes, it is anticipated that final plug consolidation, including the removal of residual temporary binder bi-products and strengthening of the seals, can occur in the course of subsequent processing steps (e.g., in the course of catalyzation or canning) or during first use (e.g., in an exhaust system).

According to exemplary embodiments of the disclosure, active plugs at the first end face of a porous ceramic honeycomb body can have a first active component and seal a portion of the outlet channels, including for example, all of the outlet channels or only outlet channels in a certain region such as a center region, a periphery region, an intermediate region, or a plurality of regions of the first end face. Further, the first active component can include a plurality of active components and the active plugs in a certain region can have an active component different than active plugs in another region of the first end face. In these exemplary embodiments, another portion of the outlet channels that are not sealed by active plugs having the first active component can be open as described above, sealed by inert plugs, or a combination thereof. In these exemplary embodiments, the walls of the porous ceramic honeycomb body can be inert, have a second active component disposed thereon, have a structure containing another active component, or any combination thereof. In these exemplary embodiments, the second active component is not the same as the first active component. In an attempt to further clarify, where the first active component includes a plurality of active components, the second active component may be the same as at least one, but not all of the plurality of first active components. In certain optional exemplary embodiments, the first active component may merely be a different concentration than the second active component, have a different particle size distribution, a different microstructure, and the like, or any combination thereof. Likewise, where the second active component includes a plurality of active components, at least one of the plurality of second active components, but not all, may be the same as the first active component.

According to these exemplary embodiments, active plugs at the second end face of the porous ceramic honeycomb body can have the first active component and seal a portion of the inlet channels, including for example, all of the inlet channels or only inlet channels in a certain region such as a center region, a periphery region, an intermediate region, or a plurality of regions of the second end face. Further, the first active component can include a plurality of active components and the active plugs in a certain region can have an active component different than active plugs in another region of the second end face. In these exemplary embodiments, another portion of the inlet channels that are not sealed by active plugs having the first active component can be sealed by inert plugs.

According to these exemplary embodiments, when active plugs at the first end face of the porous ceramic honeycomb body have the first active component and seal a portion of the outlet channels, the inlet channels can be sealed at the second end face with active plugs having the first active component, sealed at the second end face with inert plugs, or any combination thereof. For example, when the first active component includes a plurality of active components, active plugs at the first end face can have a different first active component than active plugs at the second end face.

For example, the first active component can include a first temperature active component active in a first temperature range and a second temperature active component active in a second temperature range. The first and second temperature ranges may overlap, but the first temperature range can have a lower boundary less than the second temperature range lower boundary and the second temperature range can have an upper boundary greater than the first temperature range upper boundary. For example, the first temperature active component can be disposed in active plugs at an inlet face and the second temperature active component can be disposed in active plugs at an outlet face. For example, the first temperature active component can be disposed in active plugs in a central region of an inlet face and the second temperature active component can be disposed in active plugs in a peripheral region of the inlet face. For example, the first temperature active component can be disposed in active plugs in a central region of an outlet face and the second temperature active component can be disposed in active plugs in a peripheral region of the outlet face.

As another example, the first active component can include a catalytically active component at the first end face effective to convert at least 40% of NOx in an exhaust gas and a chemically active component at the second end face effective to convert HC in the exhaust gas. For example, the catalytically active component can be disposed in active plugs in a central region of an inlet face and the chemically active component can be disposed in active plugs in a peripheral region of the inlet face.

According to these exemplary embodiments, when active plugs at the second end face of the porous ceramic honeycomb body have the first active component and seal a portion of the inlet channels, the outlet channels can be open, sealed at the first end face with active plugs having the first active component, sealed at the first end face with active plugs having another active component, sealed at the first end face with inert plugs, or any combination thereof.

In exemplary embodiments the active plugs comprise between 10 wt % and 90 wt % of the first active component. For example, the active plugs comprise between 20 wt % and 80 wt % of the first active component. For example, the active plugs comprise between 30 wt % and 70 wt % of the first active component, or even between 40 wt % and 60 wt % of the first active component. When the first active component includes a plurality of active components, the active plugs including different first active components may merely include different amounts of the first active component. For example, active plugs in a center region of an inlet face may include 60 wt % to 80 wt % of the first active component and active plugs in a peripheral region of an inlet face may include 20 wt % to 40 wt % of the first active component.

In these exemplary embodiments, the active plugs in at least one of a portion of the outlet channels and a portion of the inlet channels can be axially spaced apart from the respective end face. That is, for example, when at least a portion of the outlet channels are plugged at the inlet face, the plugs, including active plugs, may be offset from the inlet face. This can provide a reduction in thermal mass near the inlet region of a filter by moving the plugs downstream. This can provide early light-off advantages, overall higher conversion, and elimination of additional stacked light-off filter upstream of the filter having offset plugs according to these exemplary embodiments of the disclosure.

In these exemplary embodiments, the active plugs in at least one of a portion of the outlet channels and a portion of the inlet channels can each include a first layer disposed in contact with the intersecting walls and a second layer disposed on the first layer inward toward an axial center of each channel from the intersecting walls, where at least one of the first layer and the second layer includes the first active component.

Figure 2:
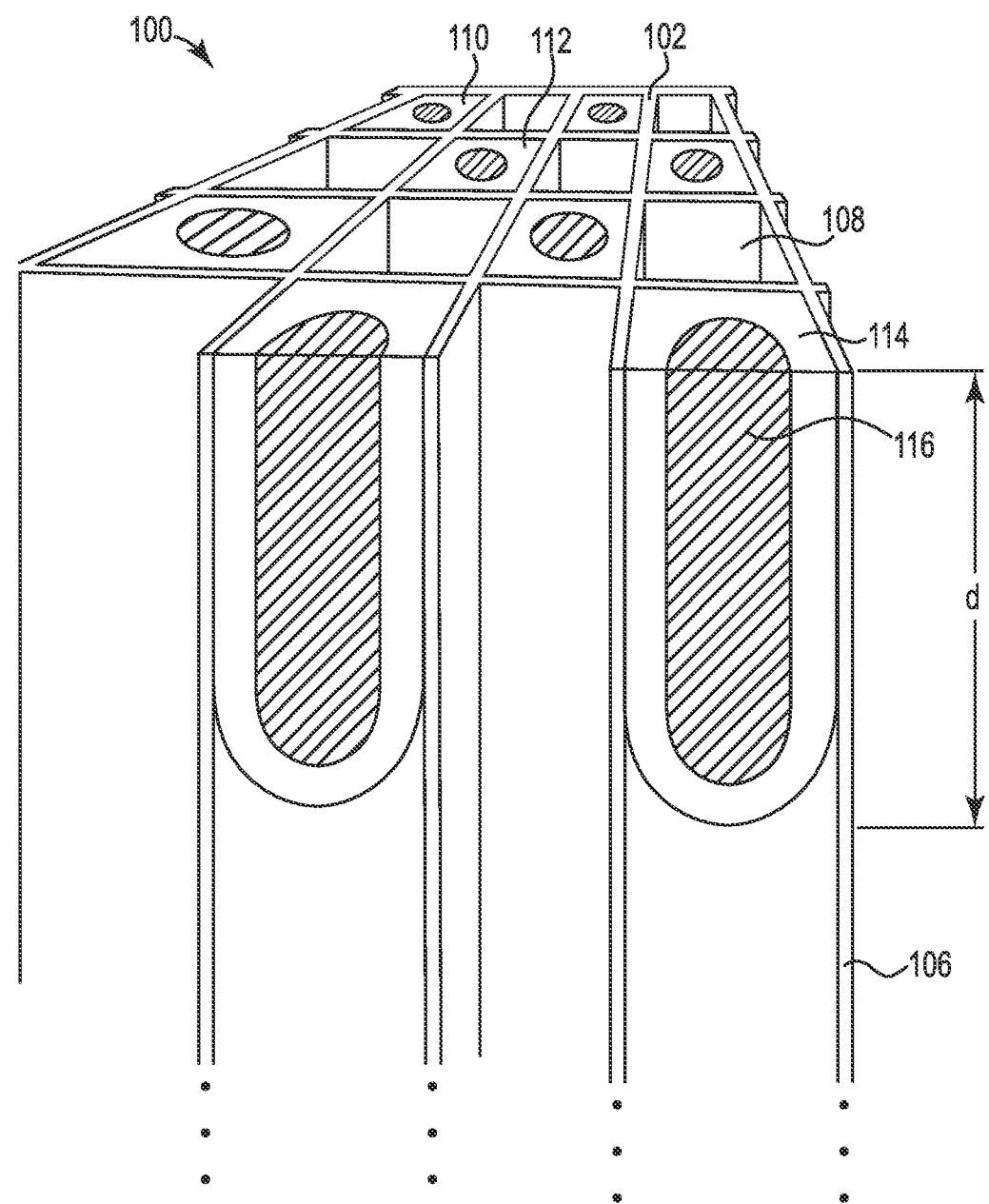
FIG. 2 is an isometric cutaway view of composite active plugs according to an exemplary embodiment of the disclosure.

For example, as shown in FIG. 2 when at least a portion of the outlet channels 110 are plugged at the inlet face 102, the plugs 112, including active plugs, may have a composite structure 114, 116. This can provide control over plug properties that vary in a direction perpendicular to the axial channel direction. For example, the first active component in the composite active plug may be in a second layer 116 having a coefficient of thermal expansion (CTE) different than the CTE of the honeycomb body walls 106. To provide an improved plug strength or improved bond strength to the honeycomb body walls, the first layer 114 can have a CTE intermediate between the CTE of the second layer 116 and the CTE of the honeycomb body walls 106 according to these exemplary embodiments of the disclosure. Furthermore, when the first active component comprises a plurality of active components, the first layer 114 and the second layer 116 according to these exemplary embodiments may include different active components.

In these exemplary embodiments, a method of making the active plugs in at least one of a portion of the outlet channels and a portion of the inlet channels having the composite layered structure 114, 116 is provided. In the method, a first layer patty is disposed on a second layer patty where the second layer patty is disposed on a support. The support is pressed toward a masked porous ceramic honeycomb body in an axial direction a predetermined distance to inject the first layer 114 and the second layer 116 in open channels of an end face to form plugs to seal the channels at the end face. The plugs include the first layer 114 disposed on the walls 106 of respective channels, and a second layer 116 disposed inward toward an axial center of each respective channel on the first layer. It was surprisingly discovered that the first layer patty disposed in a sheet perpendicular to the honeycomb body axial channel direction having the second layer patty disposed thereon forms a first layer of the composite plug on the honeycomb body walls perpendicular to the starting sheet with the second layer patty forming the second layer of the composite plug on the first layer also in a direction perpendicular to the starting position of the first layer patty and second layer patty to seal the honeycomb body channels.

According to these exemplary embodiments, additional layers of the composite plugs can be formed by providing additional layer patties.

In these exemplary embodiments, a method of making the active plugs in at least one of a portion of the outlet channels and a portion of the inlet channels axially spaced apart from the respective end face is provided. The method can include masking an end face and pressing the plugging cement composition, for example, including the first active component, into the masked end face filling the open channels with the plugging cement composition. Then a patty comprised of an organic material, such as wax, can be pressed into the masked end face to push the plugging cement composition further along the channels in the axial direction to offset the plugging cement composition from the end face. A heat treatment or chemical treatment can be used to burn out or remove the organic material. A heat treatment may simultaneously cure the plugging cement composition forming plugs bonded to the channel walls.

EXAMPLES

Exemplary embodiments are further described below with respect to certain exemplary and specific embodiments thereof, which are illustrative only and not intended to be limiting.

Since the purpose of plugs is to force gas flow through the porous honeycomb walls, it was surprising and unexpected that significant catalytic activity was observed from catalytically active plugs. To prepare exemplary and comparative samples, core-drilled 2" diameter by 6" long pieces from a 350 cpsi/12 mil wall thickness (350/12) (54.25 cells per square cm/305 μm wall thickness) Cordierite-Mullite-Aluminum titanate (CMAT) honeycomb body were prepared. The comparative example (C1) was plugged with a standard plugging paste as indicated in Table 1. The exemplary examples (E1 and E2) were plugged with compositions according to exemplary embodiments of the disclosure as indicated in Table 2.

TABLE 1

| Step | Procedure | C1 | grams | Time (s) | % Total |
|---|---|---|---|---|---|
| 1 | Add | Coarse Cordierite | 1152.01 | | 57.6004 |
| 2 | Add | F240 Methocel ® | 11.52 | | 0.576 |
| 3 | Add | Citric Acid monohydrate | 11.75 | | 0.5875 |
| 4 | Mix | Dry mix | | 300 | |
| 5 | Pre-mix | Ludox ® HS-40 | 437.19 | | 21.8593 |
| 6 | Pre-mix TEA Soln | Triethanolamine 85% RO water | 72.81 314.73 | 60 (stir) | 3.6403 15.7364 |
| 7 | Pre-mix | TEA Soln to Ludox ® HS-40 | | 60 (stir) | |
| 8 | Add | All pre-mixed liquids | | | |
| 9 | Add | Coloring (30 drops of BLUE) | | 60 (stir) | |
| 10 | Mix | NO vacuum | | 120 | |
| 11 | Scrape | beaters and bowl | | | |
| 12 | Mix | Vacuum − 15" Hg (+/− 3") | | 480 | |
| 13 | Test | Ball Push (kg) | | | |

In steps 1 through 4 all powders were added to the mixing bowl and dry mix was performed for five minutes. Step 5 included measuring Ludox® HS-40. Step 6 included measuring TEA and water into separate containers, adding the water to the TEA and stirring TEA solution for one minute. Step 7 included adding the TEA solution to the Ludox® HS-40 and stirring for one minute. Steps 8 and 9 included adding all pre-mixed liquids and coloring to bowl when dry mixing was completed. Step 10 included performing wet mix for two minutes with NO vacuum, disperser @2,200 rpm and planetary @35 rpm. Step 11 included scraping batch from mixer beaters and around the inside of the bowl when wet mix was completed. Step 12 included performing final wet mix for eight minutes with vacuum of 15 inches of Hg, disperser @2,200 rpm and planetary @35 rpm.

TABLE 2

| grams | E1 and E2 |
|---|---|
| 50 | CuCHA powder |
| 1 | A4M Methocel ® |
| 25 | TMA Ludox |
| 2.5 | Cu Acetate (5% soln) |
| 25 | $H_2O$ |

E1 and E2 compositions were mixed two times on channel 17 in Mazurestar® mixer. All samples were calcined at 650° C. for 2 hrs. The plug materials were also calcined separately to test the NO conversion as a powder (FIG. 3).

Figure 3:
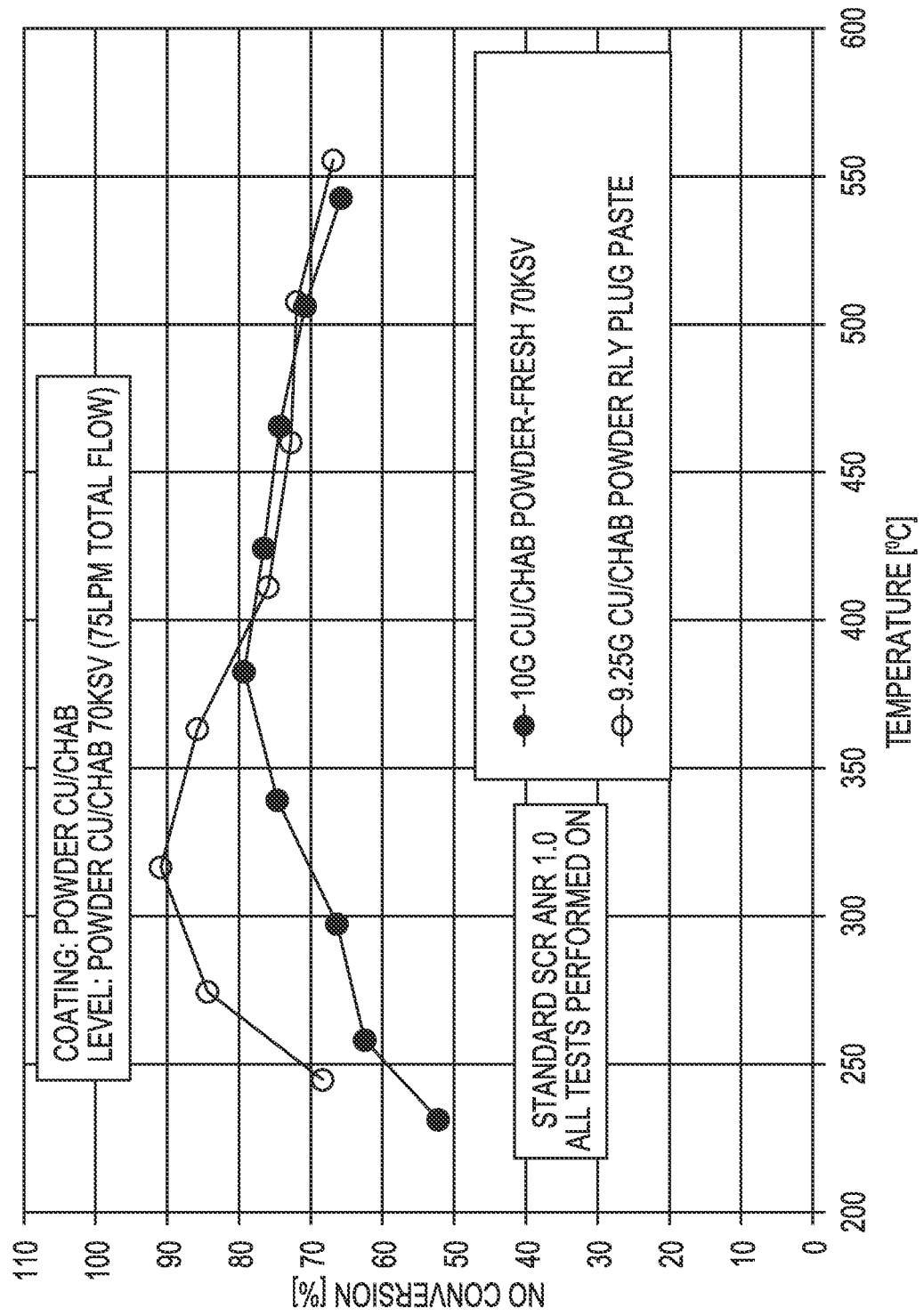
FIG. 3 is a graphical plot of data showing NO conversion of a comparative sample of copper-chabazite zeolite powder compared to powder according to an exemplary embodiment of the disclosed plug material showing that the catalytic activity is improved.

FIG. 3 is a graphical plot of data showing NO conversion of a comparative sample of copper-chabazite zeolite powder compared to powder according to an exemplary embodiment of the disclosed plug material showing that the catalytic activity is improved. That is, FIG. 3 shows that the active material is still active after making into a plug batch cement composition. FIG. 3 shows the catalytic activity for compositions, that is, not formed into plugs in honeycomb body channels. Surprisingly, the catalytically active copper-chabazite zeolite and colloidal silica made into the plug composition was even more catalytically active than the copper-chabazite zeolite alone.

Steady state NOx conversion was measured over powder catalyst beds using a flow reactor with $NH_3/NOx=1$ (in FIG. 3, "ANR" refers to ammonia-to-NOx ratio) and a space velocity of 70,000 $h^{-1}$ (75 LPM total flow). The two powder samples were (a) zeolite powder as-received loaded into the reactor bed and (b) zeolite powder formed into a paste as would be done to form a plug cement. The data show that the zeolite activity is not adversely affected by the process of forming plug paste.

Figure 4:
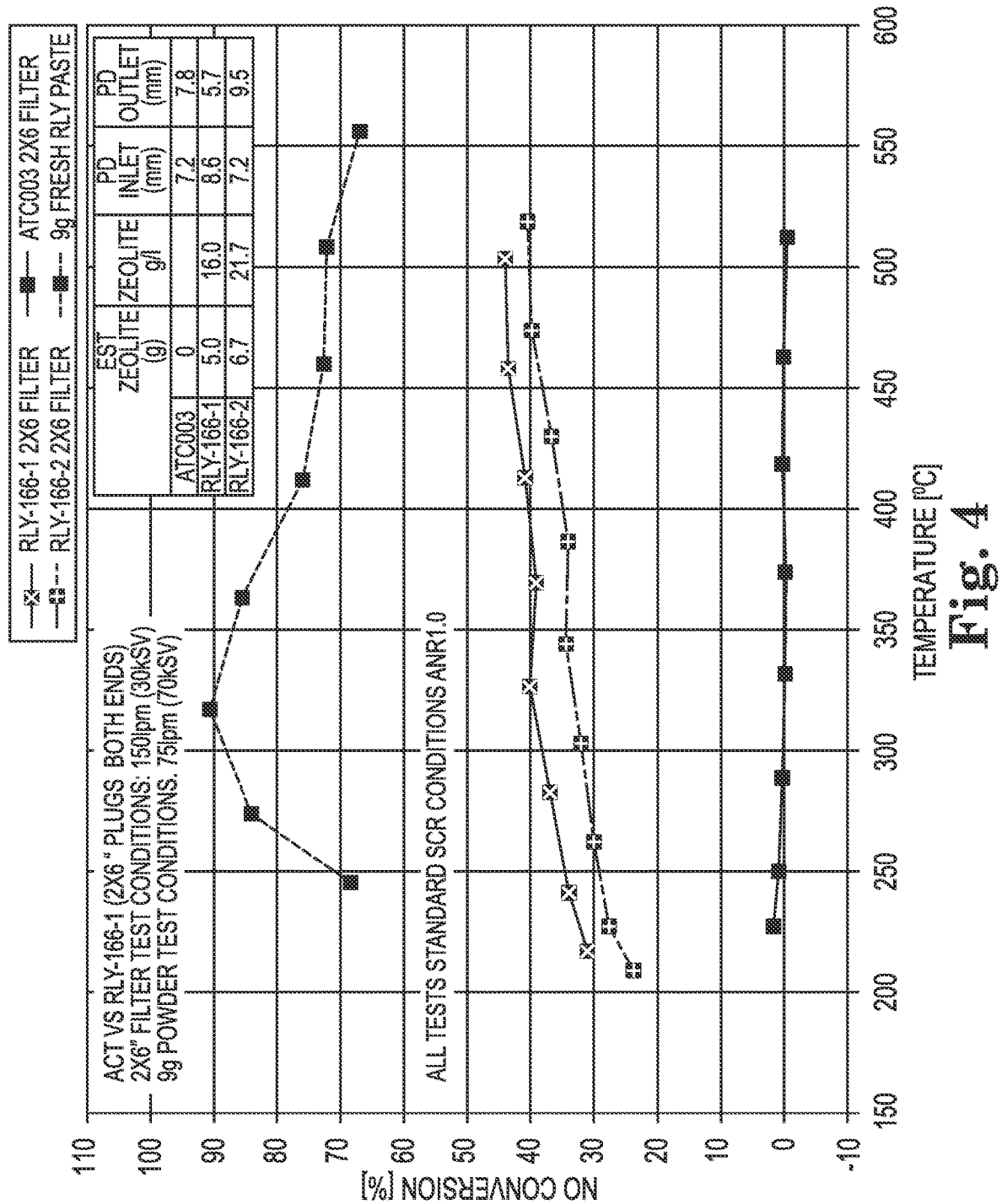
FIG. 4 is a graphical plot of data showing the results of NO conversion efficiency for exemplary examples and a comparative example with inactive plugs. The results for the powder sample according to the exemplary embodiment of the present disclosure shown in FIG. 3 are also shown.

FIG. 4 shows steady state NOx conversion for three 2"×6" AT filters. The same flow reactor mentioned above was used with $NH_3/NOx=1$ and 30,000 $h^{-1}$ space velocity (150 LPM total flow). The absolute weight of zeolite, the normalized weight in g/L, and the plug depths "PD" are similar for the control and the active plugs. One of the AT filters has standard, catalytically non-active plugs and the conversion is close to zero. The other two AT filters have active plugs and the activity boost from the active plugs is clearly seen.

FIG. 4 is a graphical plot of data showing the results of NO conversion efficiency for exemplary examples E1 and E2 and comparative example C1 with inactive plugs. The results for the powder sample according to the exemplary embodiment of the present disclosure shown in FIG. 3 are also shown. FIG. 4 shows that the NO conversion for the comparative example C1 with the inactive plugs was close to zero, whereas the catalytic activity for the parts plugged with the exemplary examples E1 and E2 active plug composition showed significant NO conversion.

To test the survivability of the E1 and E2 composition active plugs at high temperature honeycomb bodies including the active plugs were heated to 1200 and 1300° C. At 1200° C. the plug integrity was maintained. At 1300° C. the plugs sintered and began to lose integrity.

Modeling

A flow of exhaust gas through a pair of channels representing an inlet and outlet channel separated by a permeable membrane was modeled. Zeolite plugs were applied to the inlet and outlet face of alternate channels in the model. The modeling provided a determination of where and how much conversion of NO was occurring at different temperatures and for different washcoating strategies.

Figure 5A:
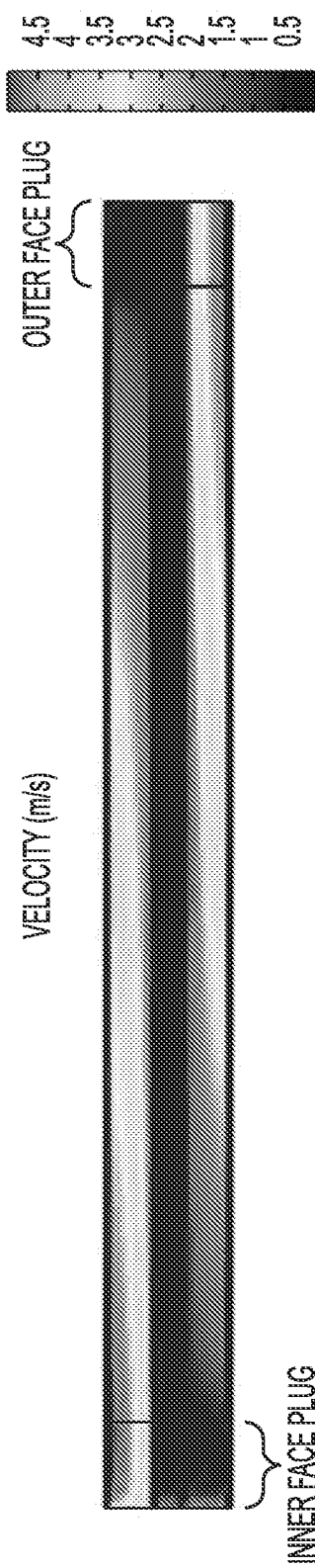
FIGS. 5A and 5B are plots of modeling results of steady state flow velocity through two channels at 300° C. with an inlet face active plug on the lower channel and an outlet face active plug on the upper channel according to these exemplary embodiments of the disclosure. Each channel is symmetric such that only half of the vertical extent of the channel is shown.
Figure 5B:
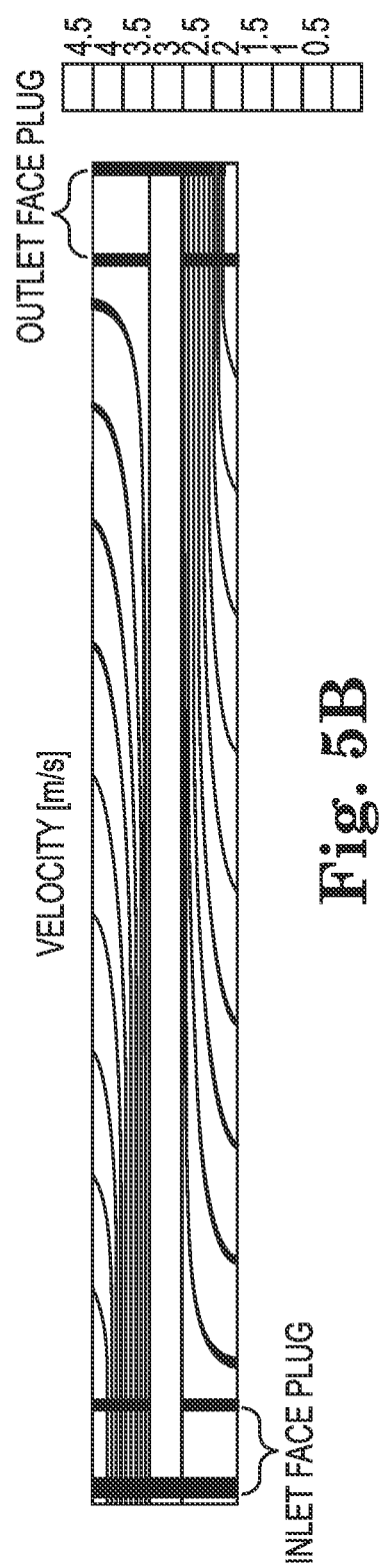

FIGS. 5A and 5B are plots of modeling results of steady state flow velocity through two channels at 300° C. with an inlet face active plug on the lower channel and an outlet face active plug on the upper channel according to these exemplary embodiments of the disclosure. Each channel is symmetric such that only half of the vertical extent of the channel is shown.

Figure 6A:
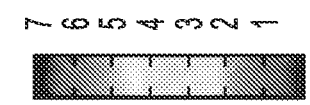
FIGS. 6A and 6B are a close-up of the inlet region of the modeling results of FIGS. 5A and 5B showing the local reaction rate in the wall and the inlet face active plug at steady state at 300° C. Some NO conversion is occurring in the wall, but most of it is occurring in the inlet face active plug.
Figure 6A:
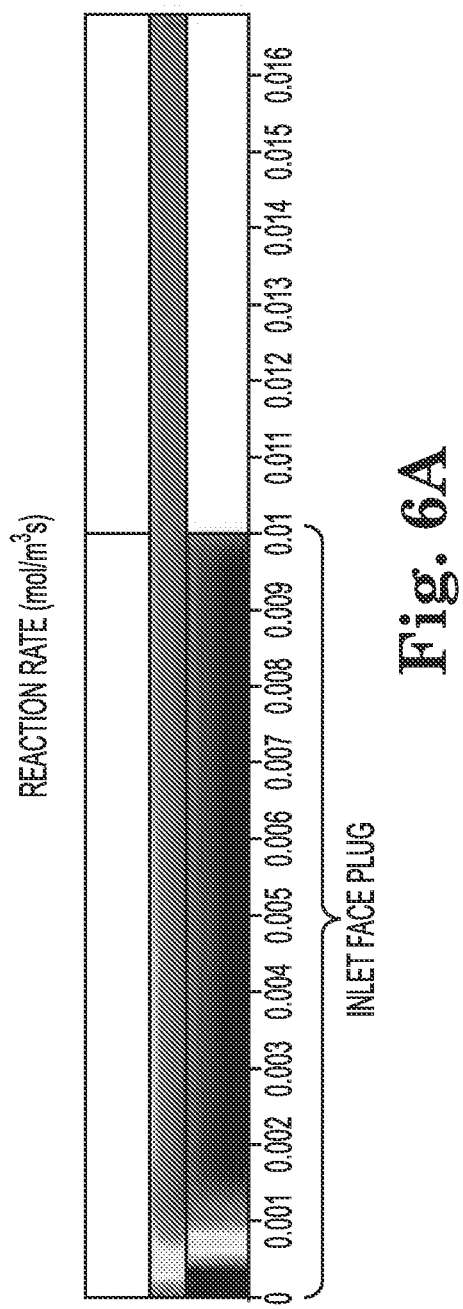
Figure 6B:
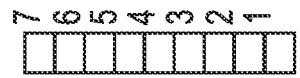
Figure 6B:
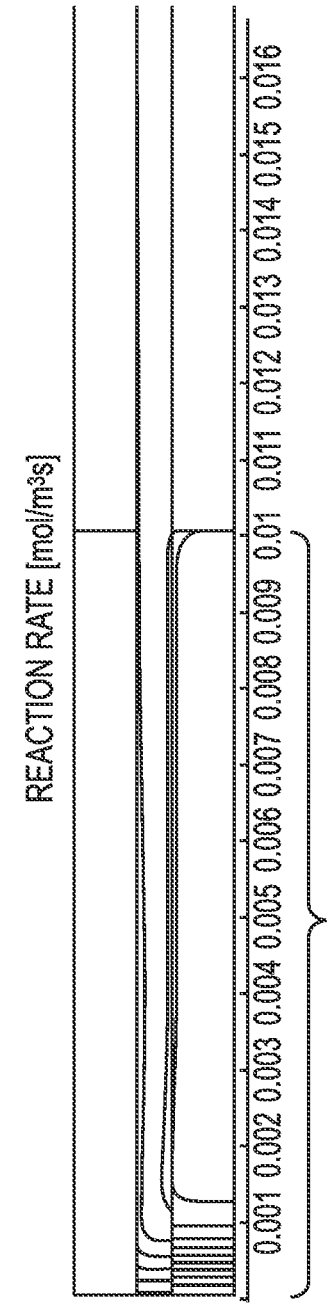

FIGS. 6A and 6B are a close-up of the inlet region of the modeling results of FIGS. 5A and 5B showing the local reaction rate in the wall and the inlet face active plug at steady state at 300° C. Some NO conversion is occurring in the wall, but most of it is occurring in the inlet face active plug.

Figure 7A:
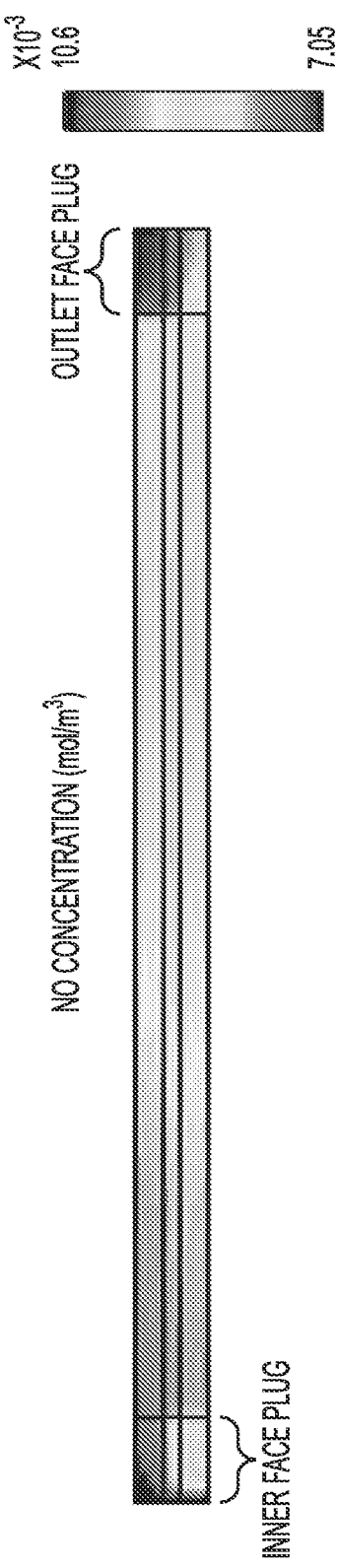
FIGS. 7A and 7B are plots of modeling results showing distribution of NO in the channels at 300° C. showing a rapid depletion of NO in the inlet face active plug, a gradual decrease as more NO reacts in the walls down the length of the part, and a final reduction in NO concentration in the outlet face active plug.
Figure 7B:
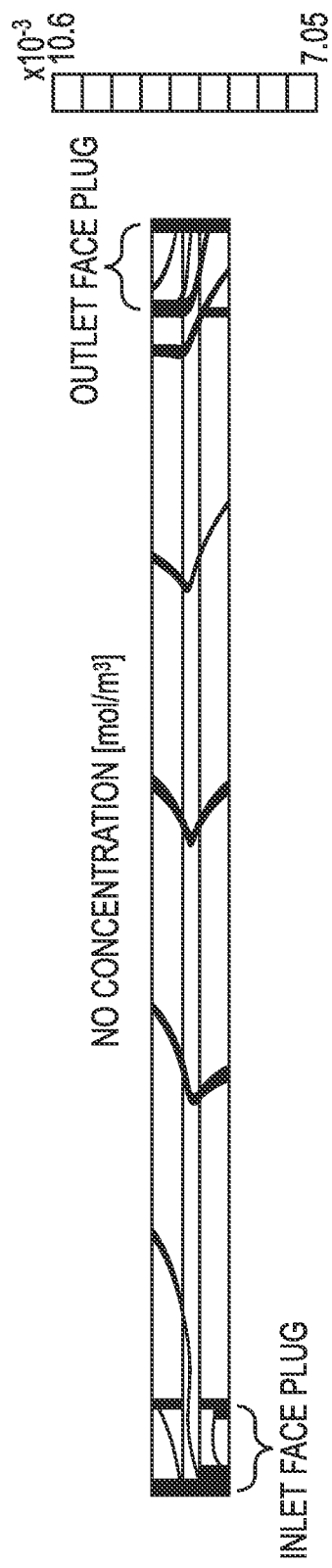

FIGS. 7A and 7B are plots of modeling results showing distribution of NO in the channels at 300° C. showing a rapid depletion of NO in the inlet face active plug, a gradual decrease as more NO reacts in the walls down the length of the part, and a final reduction in NO concentration in the outlet face active plug.

Figure 8:
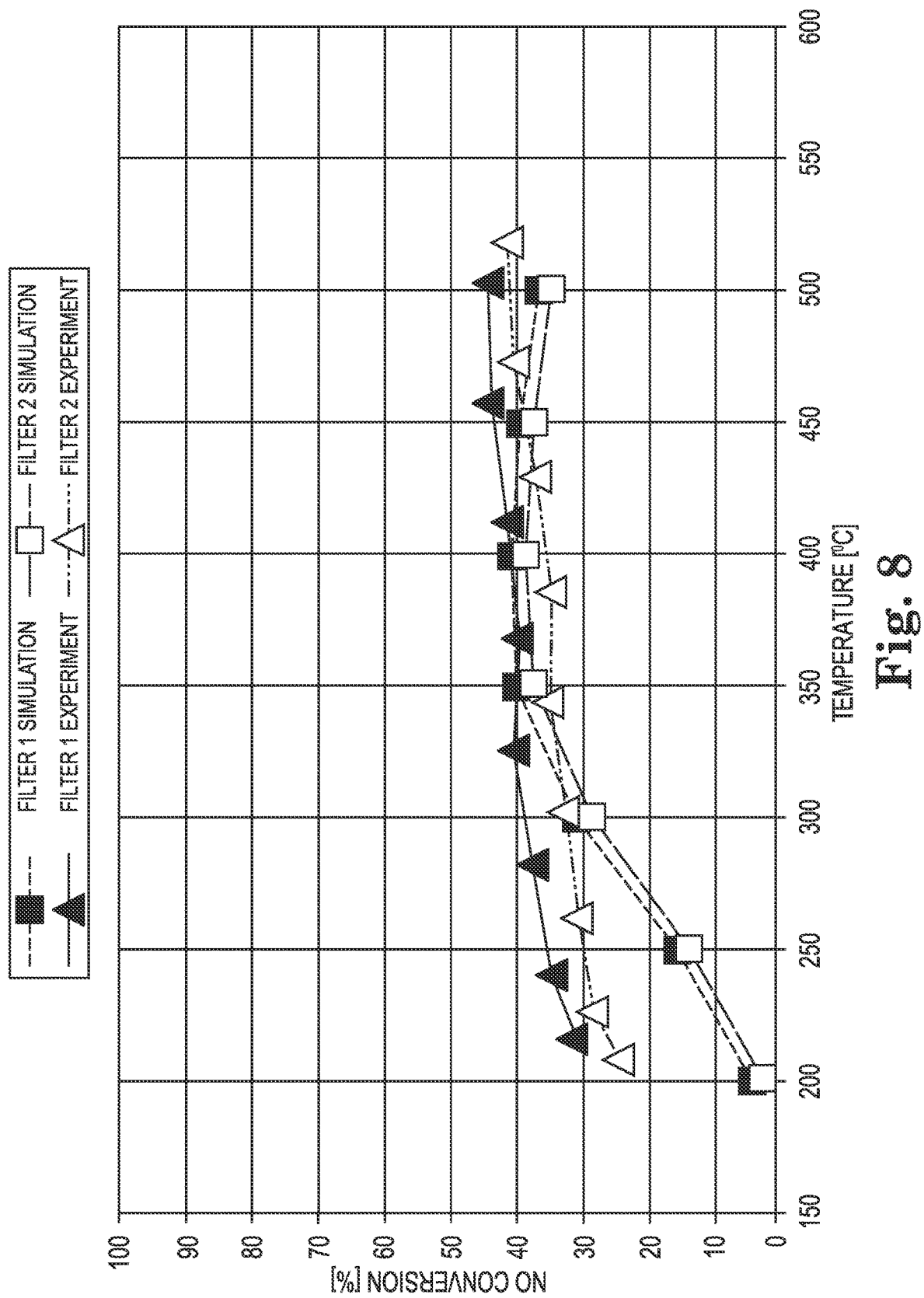
FIG. 8 provides a graphical plot of data from simulated (squares) and experimental (triangles) NO conversion at constant temperature for two Cu-zeolite plugged filters according to exemplary embodiments of the disclosure.

To confirm that the model system was reproducing the response of the actual system, the model was first calibrated using experimental measurements of the steady state conversion of NO at various temperatures. The model considers the SCR catalysis reactions of ammonia adsorption, desorption, and oxidation along with the standard and fast SCR reactions. The data in FIG. 8 shows that the model is generally able to capture the correct amount of NO conversion in the active plugs. FIG. 8 provides a graphical plot of data from simulated (squares) and experimental (triangles) NO conversion at constant temperature for two Cu-zeolite plugged filters according to exemplary embodiments of the disclosure.

Figure 9:
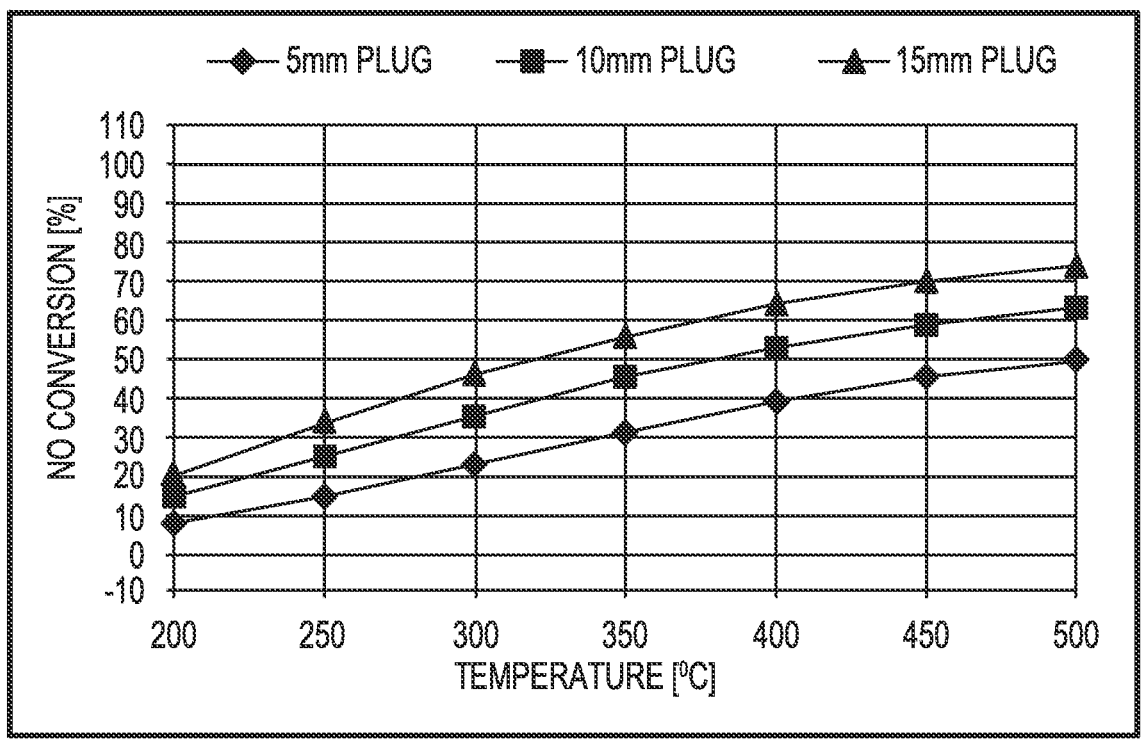
FIG. 9 provides a graphical plot of calibrated modeled data showing NO conversion as a function of temperature for varying plug lengths according to exemplary embodiments of the disclosure.

The calibrated model determined how varying the filter design altered the performance. In FIG. 9, the impact of changing the length of the plugs on NO conversion is shown. As the plug length is increased, NO conversion increases for each temperature studied. FIG. 9 provides a graphical plot of calibrated modeled data showing NO conversion as a function of temperature for varying plug lengths according to exemplary embodiments of the disclosure. This increase in conversion at higher plug length comes at the cost of an increase in the pressure drop since the longer plugs leave less wall area for the exhaust gas to flow through between the inlet and outlet channels.

Figure 10:
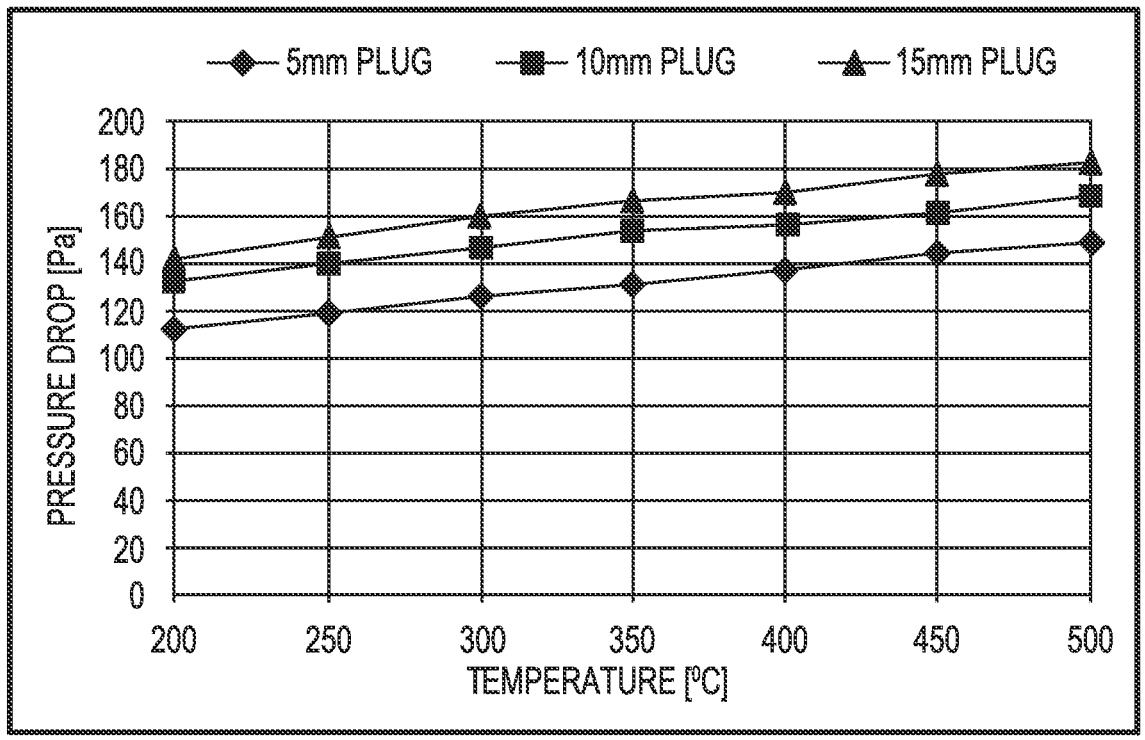
FIG. 10 provides a graphical plot of calibrated modeled data showing pressure drop across the filter for varying plug lengths according to exemplary embodiments of the disclosure.

FIG. 10 provides a graphical plot of calibrated modeled data showing pressure drop across the filter for varying plug lengths according to exemplary embodiments of the disclosure. FIG. 10 shows that the pressure drop increases by about 30 Pa as the active plug length is increased from 5 to 15 mm. The tradeoff between pressure drop and conversion can be seen in FIG. 11.

Figure 11:
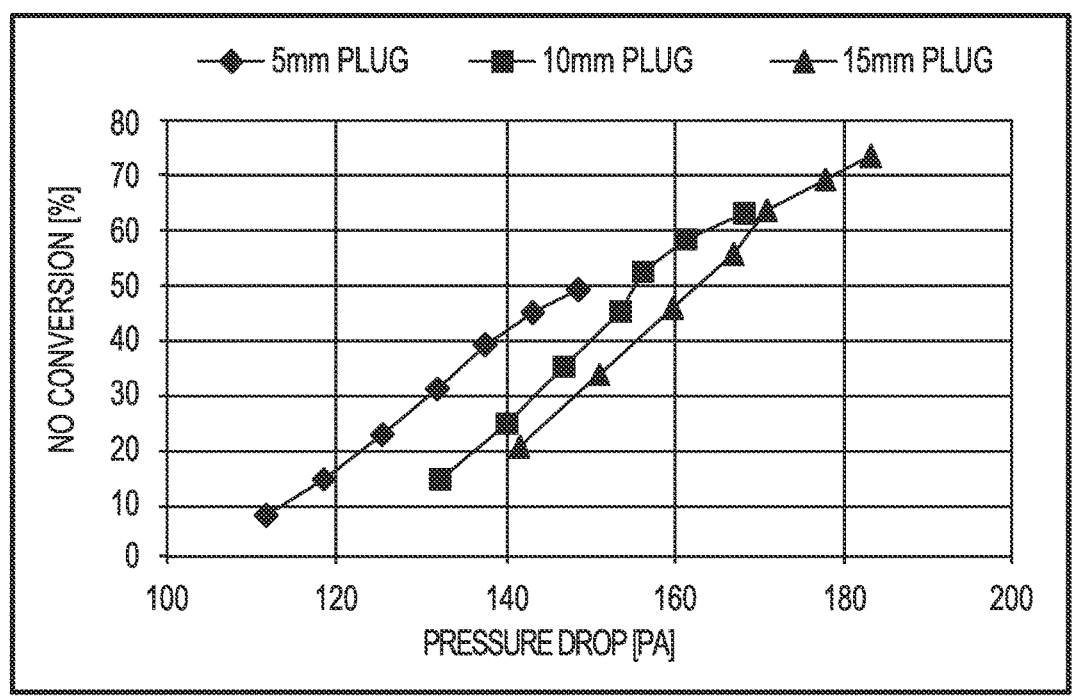
FIG. 11 provides a graphical plot of calibrated modeled data showing balance between improved NO conversion and increased back pressure for various plug lengths according to exemplary embodiments of the disclosure.

FIG. 11 provides a graphical plot of calibrated modeled data showing balance between improved NO conversion and increased back pressure for various active plug lengths according to exemplary embodiments of the disclosure. If the increase in pressure drop is acceptable, the longer active plug length provides the best conversion. When a maximum allowable pressure drop is specified for a certain application, the active plug length can be adjusted to meet the specified pressure drop while providing optimal conversion.

Figure 12:
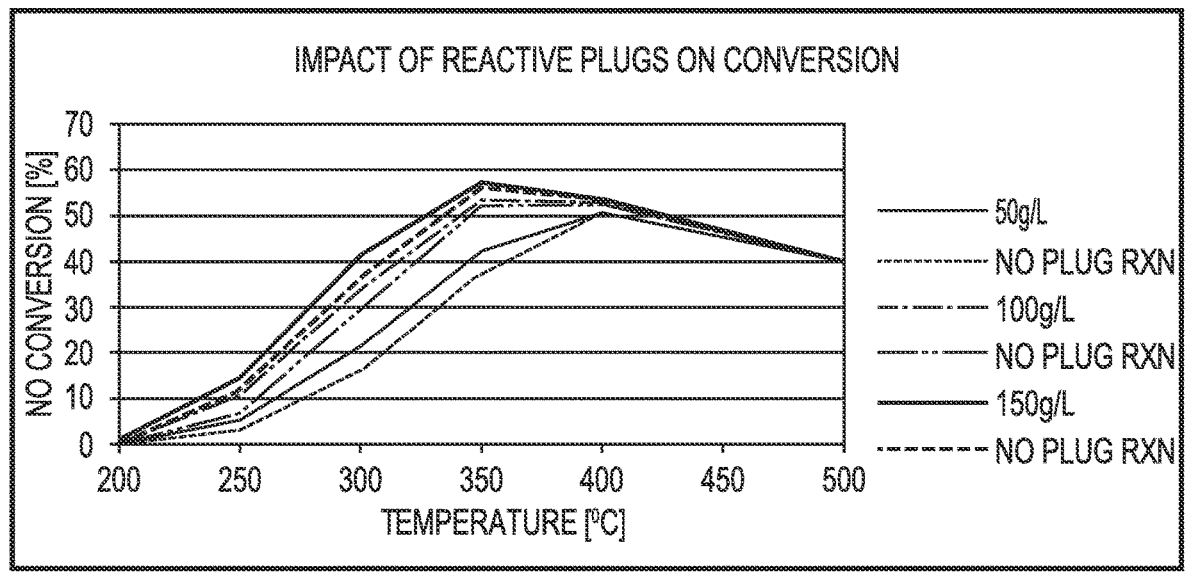
FIG. 12 provides a graphical plot of calibrated modeled data showing impact of reactive plugs on washcoated filter according to exemplary embodiments of the disclosure.

Using Cu zeolite material in the active plugs of a bare part shows appreciable conversion by itself. FIG. 12 provides a graphical plot of calibrated modeled data showing impact of active plugs on washcoated filter according to exemplary embodiments of the disclosure. The presence of active plugs actually improved the conversion of an additionally washcoated filter. FIG. 12 shows that for all three levels of washcoat loading, adding Cu zeolite material to the plug further improved the conversion performance. Here, the improvement is evident in the 200 to 400° C. temperature range. Although the examples and modeling presented herein were focused on SCR applications, they can readily be applied to other areas where filters are used to convert exhaust gas.

According to exemplary embodiments of the disclosure, an exhaust gas filter with catalytically active plugs can have reduced emissions, lower pressure drop, lower cost, faster light off, and/or smaller size than a filter having non-active plugs. The catalytic activity contributed from active plugs can lead directly to a decrease in the washcoat loading needed to achieve emissions targets, with advantages in pressure drop and fast light off. For example, exemplary embodiments of the reactive plugs provide improved NOx conversion, especially at low temperatures (e.g., up to 400° C.), which is a significant challenge in SCR technology.

Advantages of exemplary embodiments include using longer zeolite plugs to provide progressively higher NOx conversion with only slightly higher pressure drop. This trend continues up to at least 15 mm active plugs. Compared to a filter washcoated with zeolite, adding zeolite containing plugs further improves the conversion efficiency at temperatures from 200 to 400° C. Advantages of exemplary embodiments include active plugs for hydrocarbon (HC) traps. Advantages include improved utilization of the space occupied by the filter. In contrast, non-active plugs are inert and represent dead space.

The method of making plugs according to exemplary embodiments of the disclosure can result in improved catalytic activity and reduced interaction of colloidal material with microcracks in the honeycomb body.

It will be apparent to those skilled in the art that various modifications and variations can be made in the disclosed exemplary embodiments without departing from the spirit or scope of the disclosure. Thus, it is intended that the appended claims cover the modifications and variations of this disclosure provided they come within the scope of the appended claims and their equivalents.

What is claimed is:

1. A porous ceramic honeycomb body, comprising:
   intersecting walls that form channels extending axially from a first end face to a second end face; and
   active plugs to seal at least one of a first portion of the channels at the first end face and a second portion of the channels at the second end face, each active plug comprising:
   a first active component, wherein the first active component comprises at least one of a catalytically active component and a chemically active component of the plugging cement, wherein the first active component is incorporated in and forms the structure of the active plugs, and wherein the intersecting walls do not comprise the first active component.

2. The porous ceramic honeycomb body of claim 1, wherein the intersecting walls comprise a second active component comprising at least one of a catalytically active component and a chemically active component,
   wherein the second active component is at least one of: disposed on wall surfaces, disposed in pores of the walls and disposed throughout the structure of the walls.

3. The porous ceramic honeycomb body of claim 1, wherein each plug comprises a first layer disposed in contact with the intersecting walls and a second layer disposed on the first layer inward toward an axial center of each channel from the intersecting walls, and wherein at least one of the first layer and the second layer comprises the first active component.

4. The porous ceramic honeycomb body of claim 1, wherein a batch cement composition that forms each plug comprises the first active component.

5. The porous ceramic honeycomb body of claim 1, wherein the first end face comprises a filter inlet and the second end face comprises a filter outlet,
   wherein the first active component comprises a plurality of active components, the plurality of active components comprising:
   a first temperature active component at the inlet end active in a first temperature range and a second temperature active component at the outlet end active in a second temperature range.

6. The porous ceramic honeycomb body of claim 5, wherein the first temperature range has a lower boundary less than a lower boundary of the second temperature range and the second temperature range has an upper boundary greater than an upper boundary of the first temperature range.

7. The porous ceramic honeycomb body of claim 1, further comprising non-active plugs disposed to seal channels at least at one of the first end face and the second end face.

8. The porous ceramic honeycomb body of claim 1, wherein the first end face comprises a filter inlet and the second end face comprises a filter outlet,
wherein the first active component comprises a plurality of active components, the plurality of active components comprising:
a first temperature active component in a first group of channels at the inlet end active in a first temperature range and a second temperature active component in a second group of channels at the inlet end active in a second temperature range.

9. The porous ceramic honeycomb body of claim 1, wherein the first temperature range has a first lower boundary less than a second lower boundary of the second temperature range and the first temperature range has a first upper boundary less than a second upper boundary of the second temperature range.

10. The porous ceramic honeycomb body of claim 1, wherein the first end face comprises a filter inlet and the second end face comprises the filter outlet,
wherein the first active component comprises a plurality of active components, the plurality of active components comprising:
a catalytically active component at the inlet end effective to convert at least 40% of NOx in an exhaust gas and a chemically active component at the outlet end effective to convert HC in the exhaust gas.

11. The porous ceramic honeycomb body of claim 1, wherein the active plugs in at least one of the first portion of the channels and the second portion of the channels are axially spaced apart from the respective end face.

12. The porous ceramic honeycomb body of claim 1, wherein the active plugs comprise between 10 wt % and 80 wt % of the first active component.

13. The porous ceramic honeycomb body of claim 1, wherein the first active component comprises at least one of copper-zeolite, HC traps, on board diagnosis oxygen storage material, ceria:zirconia solid solution material, ceria:zirconia multi-phase material, a three way catalyst (TWC), a platinum group metal (PGM), rhodium-titania, calcium carbonate, zeolite, Cu-exchanged zeolite, Fe-exchanged zeolite, PGM disposed on alumina, Cu-chabazite zeolite, and an alkali earth metal oxide.

14. A method of plugging a porous ceramic honeycomb body comprising intersecting walls that form channels extending axially from a first end face to a second end face, the method comprising:
applying to the honeycomb body to form active plugs, a composition comprising:
an active component;
a refractory filler having a particle size distribution;
an organic binder;
an inorganic binder; and
a liquid vehicle;
wherein the active component comprises at least one of a catalytically active component and a chemically active component,
wherein the first active component is incorporated in and forms the structure of the active plugs, and
wherein the intersecting walls do not comprise the active component.

15. The method of claim 14, further comprising drying and firing the ceramic honeycomb body having the composition applied thereto to form a filter or a partial filter.

16. The method of claim 14, wherein applying comprises:
disposing a first layer patty on a second layer patty;
disposing the second layer patty on a support;
pressing the support and the porous ceramic honeycomb body together in an axial direction a predetermined distance to inject the first layer and the second layer in at least one of a first portion of the channels at the first end face and a second portion of the channels at the second end face to form plugs to seal at least one of first portion of the channels at the first end face and a second portion of the channels at the second end face, the plugs comprising a first layer disposed on the walls of respective channels, and a second layer disposed inward toward an axial center of each respective channel on the first layer,
wherein at least one of the first layer and the second layer comprises the active component.

17. The method of claim 14, wherein the active plugs comprise between 10 wt % and 80 wt % of the active component.

18. The method of claim 14, wherein the active component comprises at least one of copper-zeolite, HC traps, on board diagnosis oxygen storage material, ceria:zirconia solid solution material, ceria:zirconia multi-phase material, a three way catalyst (TWC), a platinum group metal (PGM), rhodium-titania, calcium carbonate, zeolite, Cu-exchanged zeolite, Fe-exchanged zeolite, PGM disposed on alumina; Cu-chabazite zeolite, and an alkali earth metal oxide.

19. The method of claim 14, further comprising a gelling agent comprising at least one of an organic salt, magnesium acetate, and copper acetate,
wherein the inorganic binder comprises colloidal silica, the organic binder comprises methylcellulose, the active component comprises Cu-chabazite.

20. The method of claim 14, wherein the applying comprises disposing the composition in the channels to form active plugs axially spaced apart from the nearest end face.

21. The method of claim 14, further comprising applying a non-active composition to the honeycomb body to form non-active plugs, the non-active composition comprising:
a refractory filler having a particle size distribution;
an organic binder;
an inorganic binder; and
a liquid vehicle.

* * * * *